United States Patent [19]

Christman

[11] Patent Number: 4,614,754
[45] Date of Patent: Sep. 30, 1986

[54] RIGID POLYURETHANE FOAMS WITH CONSTANT OR SLIGHTLY DECREASING STRAIN WITH AN INCREASING STRESS IN COMPRESSION

[75] Inventor: Donald L. Christman, Grosse Ile, Mich.

[73] Assignee: BASF Corporation, Wyandotte, Mich.

[21] Appl. No.: 652,838

[22] Filed: Sep. 21, 1984

[51] Int. Cl.[4] .................... C08G 18/14; C08G 18/32
[52] U.S. Cl. .................... 521/167; 405/288; 523/130; 523/131; 523/132
[58] Field of Search ................ 521/167; 523/130–132

[56] References Cited

U.S. PATENT DOCUMENTS

| | | | |
|---|---|---|---|
| 3,072,582 | 1/1963 | Frost | 521/167 |
| 3,336,245 | 8/1967 | Britain | 521/167 |
| 3,423,344 | 1/1969 | Odinak et al. | 521/167 |
| 3,493,525 | 2/1970 | Britain | 521/167 |
| 4,243,759 | 1/1981 | Haas | 521/167 |
| 4,397,966 | 8/1983 | Stolz et al. | 521/167 |
| 4,469,822 | 9/1984 | Stolz et al. | 521/167 |

*Primary Examiner*—Herbert S. Cockeram
*Attorney, Agent, or Firm*—Norbert M. Lisicki

[57] ABSTRACT

Rigid polyurethane foams which exhibit constant or slightly decreasing strain with an increasing stress in compression are prepared employing from 30 to 60 parts of an alkoxylated toluenediamine polyol per 100 parts of polyol mixture. These foams may be employed in shoring up geological formations.

3 Claims, 1 Drawing Figure

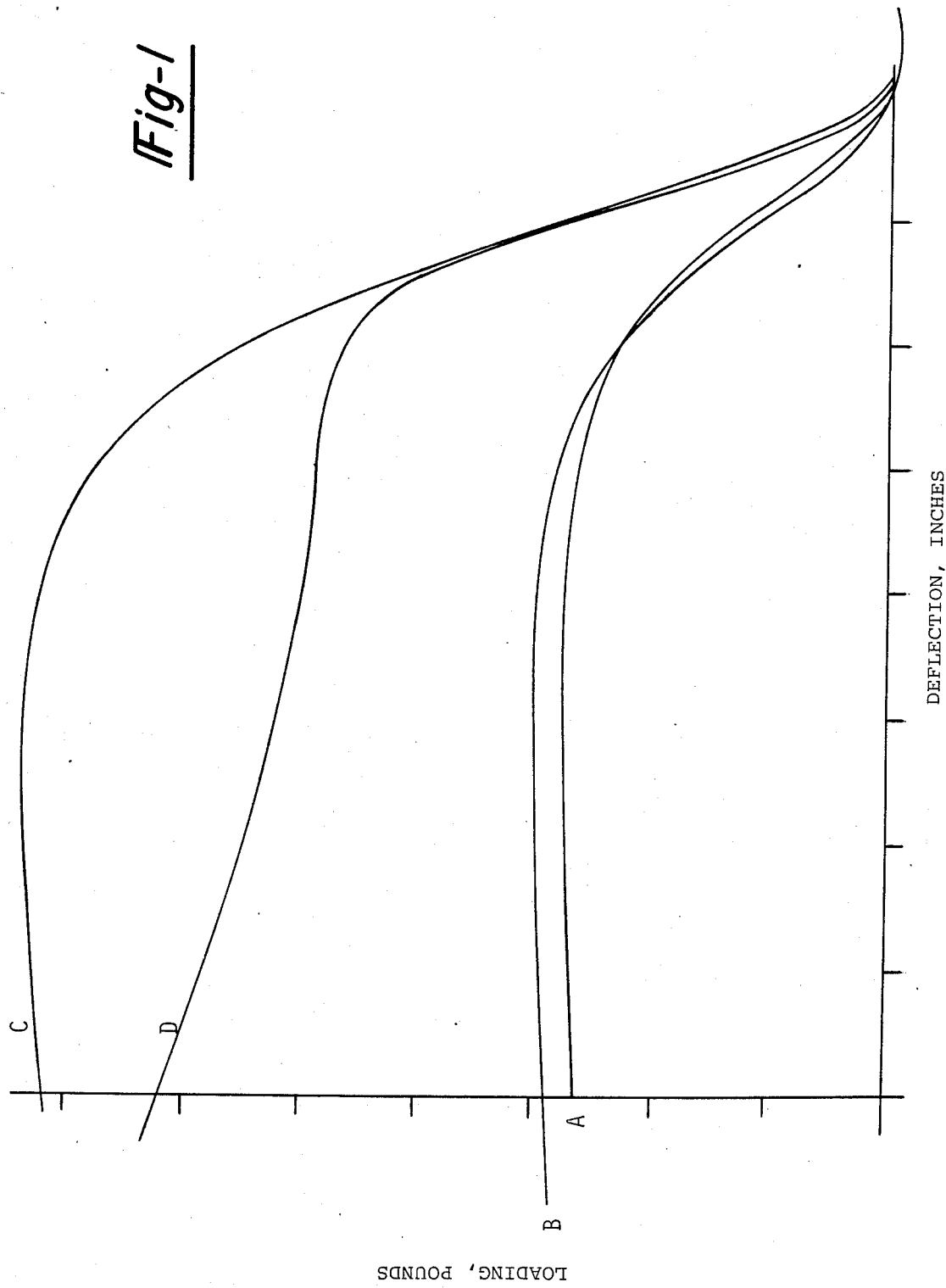

RIGID POLYURETHANE FOAMS WITH CONSTANT OR SLIGHTLY DECREASING STRAIN WITH AN INCREASING STRESS IN COMPRESSION

BACKGROUND OF THE INVENTION

1. Field of the Invention

This invention relates to rigid polyurethane foams having physical properties which result in constant or slightly decreasing strain with an increasing stress in compression. Further, this invention relates to a method of shoring up a geological formation which comprises employing these rigid foams and interposing these foams over support between those geological formation areas which are to be shored up.

2. Description of the Prior Art

U.S. Pat. No. 4,114,382 teaches a method of consolidating geological formations by applying a polyurethane reaction system to the material to be consolidated. This reaction system comprises a polyisocyanate component and a polyol component wherein the polyol component contains about 50:50 weight percent of a polyether having an OH number under about 100 and about 95:5 percent by weight of a polyol selected from the group consisting of those having 2 to 4 hydroxyl groups with a molecular weight of about 62 to 200 and a polyether polyol having an OH number about 200 to 1056 with a molecular weight of about 106 to 1000.

U.S. Pat. No. 4,452,551 teaches a process for stabilizing rock and coal formation by use of a polyurethane forming mixture which employs as the polyol component a mixture comprising polyether polyol having a hydroxyl number of 390 to 580 and having a functionality of 3 to 8 hydroxyl groups with a difunctional polyol having a hydroxyl number of 200 to 300 and from 0 to 100 parts by weight of a flexibilizing agent having a hydroxyl number of 50 to 200.

U.S. Pat. No. 4,454,252 teaches a method of sealing and consolidating water bearing geological formations by reacting a polyisocyanate in equal volume with a polyol, the polyol having a molecular weight between 400 and 600 and a hydroxyl number between 340 and 400 in the presence of an accelerator and a foam stabilizer. None of the prior art teaches the employment of a rigid polyurethane foam system which exhibits nearly constant strain with increasing stress in compression by employing an effective amount of a polyol which is an ethylene oxide-propylene oxide adduct of a toluenediamine isomer mixture.

The subject invention relates to a rigid polyurethane foam which exhibits nearly constant strain with increasing stress in compression. This rigid foam is the reaction product of a mixture of polyether polyols and organic polyisocyanates, a catalyst and a silicone surfactant wherein said polyol mixture comprises an effective amount of an alkoxylated toluenediamine polyol having a structure of

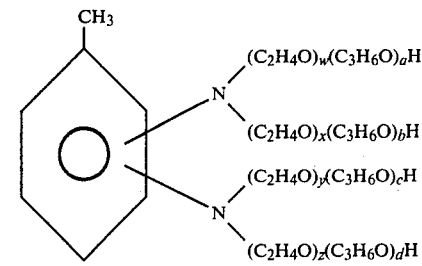

wherein w, x, y, and z represent numerals from 0 to 2; a, b, c, and d represent numerals from 1 to 5; w+x+y+z is from 2 to 5; a+b+c+d is from 2 to 5 and wherein w+x+y+z+a+b+c+d is not less than 5 nor more than 9 and a polyether polyol having a functionality from 2 to 8 and a molecular weight range from 200 to 1000. This rigid polyurethane foam may be advantageously employed for shoring up a geological formation and in equalizing the strain with increasing stress and compression of any such condition by placing a layer of said rigid foam between the imposing force and the resisting force.

BRIEF DESCRIPTION OF THE DRAWING

FIG. 1 illustrates four curves, A, B, C, and D.

Curve A represents a foam exhibiting constant strain with increasing stress in compression.

Curve B represents a foam exhibiting constant strain with increasing stress in compression.

Curve C represents a foam exhibiting slightly decreasing strain with increasing stress in compression.

Curve D represents a foam exhibiting increasing strain with increasing stress in compression.

DESCRIPTION OF THE PREFERRED EMBODIMENT

A rigid polyurethane foam which exhibits nearly constant strain with increasing stress in compression is prepared by reacting a mixture of polyether polyols, an organic polyisocyanate, in the presence of a urethane catalyst and a silicone surfactant incorporating in the polyol mixture an effective amount of a polyol having a structure of

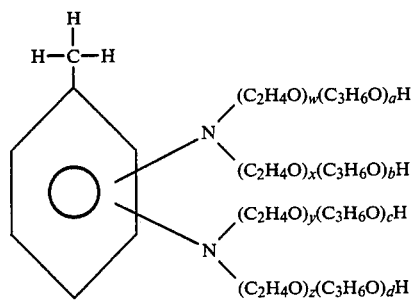

wherein w, x, y, and z represent numerals from 0 to 2; a, b, c, and d represent numerals from 1 to 5; w+x+y+z is from 2 to 5; a+b+c+d is from 2 to 5 and wherein w+x+y+z+a+b+c+d is not less than 5 nor more than 9 and a polyether polyol having a functionality from 2 to 8 and a molecular weight range from 200 to 1000. Preferably wherein w+x+y+z is about 4 and a+b+c+d is about 5. This polyol is prepared by reacting a toluenediamine isomer mixture with the desired amount of ethylene oxide and followed by capping with propylene oxide in accordance with the limitations imposed hereinabove. The toluenediamine is composed of 2,4-, 2,6-, 2,3-, and 3,4-isomers of toluenediamine, predominantly the vicinal isomers. These polyols are prepared by well known procedures employed for oxyalkylation. As stated above, the amount of toluenediamine adduct employed is one which effectively produces a rigid foam having nearly constant strain with increasing stress in compression. Preferably this range is from 30 to 60 parts of alkoxylated toluenediamine polyol per 100 parts of polyol mixture.

The polyurethane foams of the invention have the advantage of constant or slightly decreasing strain with increasing stress in compression. This means that the rigid foams may be employed in situations wherein increasing stress is imparted to a support. For example, the ceiling in mines is shored with wooden supports. When the compressive load increases upon the rigid support, it collapses suddenly. The load carried by this support is now transferred to the surrounding supports which may then collapse under the additional load. Thus, the ceiling may collapse catastrophically. It is contemplated that the rigid foams of the invention be placed into suitable containers and fitted over the wooden supports. When the ceiling settles, part of the strain is alleviated by compression of the foam. As the ceiling is actually moving, the load is spread throughout the ceiling rather than concentrated upon an incompressible post. Until such time that the foam is compressed to the limit of its compressibility, the individual post is not subjected to the full load. It is contemplated that the rigid foam of the invention may be employed in other situations wherein it is desirable to equalize strain between an imposing force and a resisting force.

Suitable polyether polyols which may be employed in mixture with the toluenediamine initiated polyol have a functionality from 2 to 8 and a molecular weight range from 200 to 1000. These polyether polyols are produced in accordance with well known methods by reacting one or more alkylene oxides with 2 to 4 carbon atoms in the alkylene radical with initiator molecules containing from 2 to 8 reactive hydrogen atoms. Suitable alkylene oxides include ethylene oxide, propylene oxide, and butylene oxide. Preferably used initiator molecules are ethylene glycol, diethylene glycol, propylene glycol, dipropylene glycol, trimethylene glycol, 1,2-butane diol, 1,3-butane diol, 1,4-butane diol, 1,2-pentane diol, 1,4-pentane diol, 1,5-pentane diol, 1,6-hexane diol, 1,7-heptane diol, glycerol, 1,1,1-trimethyol propane, 1,1,1,-trimethyol ethane, 1,2,6-hexane triol, o-methyl glucoside, pentaerythritol, sorbitol, and sucrose. Also included are compounds derived from phenols such as 2,2-bis-4-hydroxy phenyl propane, commonly known as Bisphenol A. Other initiator molecules include amines such as trialkanolamine, triethanolamine, triisopropanolamine, aliphatic, cycloaliphatic and aromatic diamines with 2 to 15 carbon atoms such as ethylenedimaine, 1,3-propanediamine, propylene diamine, 1,4-butanediamine, 1,6-hexamethylenediamine, 1,4-diaminocyclohexane, 4,4'-, 2,4'- and 2,2'-diaminodiphenylmethane.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4''-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate.

Crude polyisocyanates may also be used in the compositions of the present invention, such as crude toluene diisocyanate obtained by the phosgenation of a mixture of toluenediamines or crude diphenylmethane isocyanate obtained by the phosgenation of crude diphenylmethane diamine. The preferred or crude isocyanates are disclosed in U.S. Pat. No. 3,215,652.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines such as phenylene diamine, 1,4-cyclohexane-bis-(methylamine), ethylenediamine, diethylenetriamine, N-(2-hydroxypropyl)-ethylenediamine, N,N'-di(2-hydroxypropyl)ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

If desired, flame retardants may be incorporated in the foams. Among the flame retardants which may be employed are: pentabromodiphenyl oxide, dibromopropanol, tris($\beta$-chloropropyl)phosphate, 2,2-bis(-bromoethyl) 1,3-propanediol, tetrakis(2-chloroethyl)ethylene diphosphate, tris(2,3-dibromopropyl)phosphate, tris($\beta$-chloroethyl)phosphate, tris(1,2-dichloropropyl)phosphate, bis-(2-chloroethyl) 2-chloroethylphosphonate, molybdenum trioxide, ammonium molybdate, ammonium phosphate, pentabromodiphenyl oxide, tricresylphosphate, hexabromocyclododecane and dibromoethyl dibromocyclohexane. The concentrations of flame retardant compounds which may be employed range from 1 to 25 parts per 100 parts of polyol mixture.

The parts referred to in the Examples are parts by weight. The following abbreviations are employed.

Polyol A is a propylene oxide adduct of glycerine having a molecular weight of about 420 and a hydroxyl number of about 400.

Polyol B is a propylene oxide adduct of propylene glycol having a molecular weight of about 430 and a hydroxyl number of about 260.

Polyol C is a propylene oxide, ethylene oxide adduct of a mixture of toluenediamine isomers containing predominantly vicinal isomers, having a molecular weight of about 600, a hydroxyl number of about 400 and containing 30 percent ethylene oxide, capped with propylene oxide.

Curves A-D of FIG. 1 were developed employing the Standard Test Method for Compressive Properties of Rigid Cellular Plastics, ASTM D-1621-73 (reapproved 1979). Curves A, B, and C illustrate foams having a property of constant or slowly decreasing strain with an increasing stress. Curve D illustrates increasing strain with increasing stress.

EXAMPLE 1-28

The polyurethane foams of Tables I, II, III, and IV were prepared by charging a container with a suitable quantity of the reactants with the exception of the isocyanate as tabulated. The mixture was stirred for about 30 seconds, and allowed to set until the air bubbles had dissipated. The calculated amount of polyisocyanate was added to the container, and the resulting mixture was stirred for about 35 seconds, and the foam was allowed to rise therein. After the foam rise was completed, the resulting foam was cured for about seven days at room temperature. The physical properties were then determined.

TABLE I

| Example | 1 | 2 | 3 | 4 | 5 | 6 | 7 | 8 | 9 |
|---|---|---|---|---|---|---|---|---|---|
| Formulation, pbw | | | | | | | | | |
| Polyol A | 59.4 | 59.4 | 59.4 | 59.4 | 59.4 | 59.4 | 84.8 | 84.8 | 70 |
| Polyol B | 10.6 | 10.6 | 10.6 | 10.6 | 10.6 | 10.6 | 15.2 | 15.2 | — |
| Polyol D | 30 | — | — | — | — | — | — | — | — |
| Polyol C | — | 30 | — | — | — | — | — | — | — |
| Polyol E | — | — | 30 | — | — | — | — | — | — |
| Polyol F | — | — | — | 30 | — | — | — | — | — |
| Polyol G | — | — | — | — | — | 30 | — | — | 30 |
| Polyol H | — | — | — | — | 30 | — | — | — | — |
| DC-193 | 0.2 | 0.2 | 0.2 | 0.2 | 0.2 | 0.2 | 0.1 | 0.2 | 0.2 |
| DABCO 33 LV | 0.63 | 0.63 | 0.63 | 0.63 | 0.21 | 0.63 | 0.63 | 0.63 | 0.63 |
| T-12 | 0.07 | 0.07 | 0.07 | 0.07 | 0.07 | 0.07 | 0.07 | 0.07 | 0.07 |
| Water | 0.32 | 0.32 | 0.32 | 0.32 | 0.32 | 0.32 | 0.32 | 0.32 | 0.32 |
| Isocyanate A | 138 | 118 | 119 | 135 | 154 | 119 | 117 | 118 | 123 |
| Foam Properties | | | | | | | | | |
| Foam Density, pcf | 41.9 | 32.0 | 31.0 | 39.9 | 50.2 | 32.3 | 35.4 | 36.2 | 34.0 |
| Foam Compression Strength, psi @ 10% Deflection | 5600 | 2800 | 3260 | 4380 | 6840 | 2600 | 2600 | 2700 | 2820 |
| Slope | Rising | No change | Rising | | | | | | |

Polyol D is a propylene oxide adduct of a pentaerythritol and propylene glycol mixture having a molecular weight of about 360 and a hydroxyl number of 560.

Polyol E is a propylene oxide adduct of a mixture of toluenediamine isomers containing predominantly vicinal isomers, having a molecular weight of 570 and a hydroxyl number of 390.

Polyol F is a propylene oxide adduct of a sucrose propylene glycol mixture, having a molecular weight of 640 and a hydroxyl number of 570.

Polyol G is a propylene oxide adduct of a sucrose, dipropylene glycol mixture, having a molecular weight of 620 and a hydroxyl number of 400.

Polyol H is a propylene oxide adduct of ethylenediamine; having a molecular weight of 290 and a hydroxyl number of 770.

Isocyanate A is an oligomeric polymethylene polyphenylene polyisocyanate having an average functionality of about 2.7.

DC-193 is a silicone surfactant sold by Dow Corning.

Dabco 33LV is a catalyst sold by Air Products Corp.

T12 is a catalyst sold by M&T Corp.

Table I illustrates that rigid foam incorporating the alkoxylated toluenediamine polyol of the invention exhibits a constant slope when strain is measured at increasing stress. The rising slope indicates increasing strain with increasing stress.

TABLE II

| Example | 10 | 11 | 12 | 13 | 14 |
|---|---|---|---|---|---|
| Formulation, pbw | | | | | |
| Polyol A | 50.9 | 59.4 | 59.4 | 59.4 | 67.8 |
| Polyol B | 9.1 | 10.6 | 10.6 | 10.6 | 12.2 |
| Polyol C | 40 | 30 | 30 | 30 | 20 |
| Water Added | 0.32 | 0.32 | 0.16 | 0.24 | 0.32 |
| Isocyanate A | 125 | 122 | 122 | 123 | 124 |
| Foam Properties | | | | | |
| Foam Density, pcf | 18.90 | 20.26 | 33.02 | 15.66 | 18.59 |
| % Deflection @ Yield, comp. | 8.4 | 8.6 | 7.4 | 4.1 | 7.45 |
| Compressive Yield Pt, psi | 1096 | 970 | 2734 | 651 | 880 |
| Compressive Str, 10% defl., psi | 1084 | 960 | 3054 | 747 | 816 |
| Compressive Str, 15% defl., psi | 1040 | 936 | 3111 | 789 | 824 |
| Compressive Str, 20% defl., psi | 1060 | 960 | 3064 | 818 | 856 |
| Ratio 20%/10% | 0.98 | 1.00 | 1.00 | 1.09 | 1.05 |

Table II illustrates the strain/stress relationship employing the polyol of the invention.

TABLE III

| Example | 15 | 16 | 17 | 18 | 19 | 20 | 21 | 22 | 23 | 24 |
|---|---|---|---|---|---|---|---|---|---|---|
| Polyol A | 50.9 | 33.9 | 17.0 | — | 50.9 | 50.9 | 50.9 | 50.9 | 50.9 | 84.8 |

TABLE III-continued

| Example | 15 | 16 | 17 | 18 | 19 | 20 | 21 | 22 | 23 | 24 |
|---|---|---|---|---|---|---|---|---|---|---|
| Polyol B | 9.1 | 6.1 | 3.0 | — | 9.1 | 9.1 | 9.1 | 9.1 | 9.1 | 15.2 |
| Polyol C | 40 | 60 | 80 | 100 | 40 | 40 | 40 | 40 | 40 | — |
| Water | 0.32 | 0.32 | 0.32 | 0.32 | 0.16 | 0.24 | 0.40 | 0.32 | 0.32 | 0.32 |
| Isocyanate A | 129 | 128 | 127 | 126 | 127 | 128 | 132 | 109 | 148 | 124 |
| Foam Properties | | | | | | | | | | |
| Foam Density, pcf | 21.3 | 22.6 | 19.4 | 23.2 | 36.5 | 33.7 | 17.4 | 21.0 | 27.2 | 19.7 |
| Yield pt., psi | 1184 | 1034 | 946 | 1568 | — | 1210 | — | — | 1960 | — |
| % Yield | 10 | 9.1 | 9.1 | 10.3 | — | 13.5 | — | — | 9.8 | — |
| 10% Compressive Strength, psi | 1184 | 1032 | 940 | 1556 | 1290 | 1162 | 580 | 1058 | 1956 | 740 |
| 15% Compressive Strength, psi | 1160 | 960 | 870 | 1380 | 1368 | 1204 | 564 | 1058 | 1740 | 760 |
| 20% Compressive Strength, psi | 1160 | 964 | 856 | 1280 | 1394 | 1186 | 580 | 1084 | 1764 | 790 |
| Ratio 20%/10% | 0.98 | 0.93 | 0.91 | 0.82 | 1.08 | 1.02 | 1.00 | 1.02 | 0.90 | 1.07 |

TABLE IV

| Example | 25 | 26 | 27 | 28 |
|---|---|---|---|---|
| Formulation, pbw | | | | |
| Polyol A | 50.9 | 33.9 | 50.9 | 59.4 |
| Polyol B | 9.1 | 6.1 | 9.1 | 10.6 |
| Polyol C | 40 | 60 | 40 | — |
| Polyol F | — | — | — | 30 |
| Water | 0.32 | 0.32 | 0.16 | 0.32 |
| Foam Properties | | | | |
| Density, pcf | 20.9 | 20.7 | 32.5 | 31.1 |
| Yield Str. psi | 836 | 939 | 2244 | — |
| Compression Strength | | | | |
| 10% deflection, psi | 1014 | 1138 | 2646 | 2048 |
| 20% deflection, psi | 964 | 1138 | 2496 | 2191 |
| Ratio 20%/10% | 0.95 | 1.00 | 0.94 | 1.07 |

Curves A-D of FIG. 1 represent the foams of Examples 28, 27, 25, and 26, respectively.

The embodiments of the invention in which an exclusive privilege or property is claimed are defined as follows:

1. A rigid polyurethane foam which exhibits nearly constant strain with increasing stress in compression wherein the rigid foam is the reaction product of a mixture of polyether polyols, an organic polyisocyanate, a catalyst and a silicone surfactant wherein said polyol mixture comprises an effective amount of an alkokxylated toluenediamine polyol having a structure of

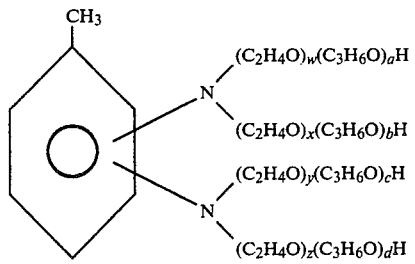

wherein w, x, y, and z represent numerals from 0 to 2; a, b, c, and d represent numerals from 1 to 5; $w+x+y+z$ is from 2 to 5; $a+b+c+d$ is from 2 to 5 and wherein $w+x+y+z+a+b+c+d$ is not less than 5 nor more than 9 and a polyether polyol having a functionality from 2 to 8 and a molecular weight range from 200 to 1000.

2. The foam of claim 1 wherein the polyol mixture contains from 30 to 60 parts of alkoxylated toluenediamine polyol per 100 parts of polyol mixture.

3. The foam of claim 1 wherein the sum of $w+x+y+z$ is about 4 and the sum of $a+b+c+d$ is about 5.

* * * * *